(12) United States Patent
Endo et al.

(10) Patent No.: US 11,114,224 B2
(45) Date of Patent: Sep. 7, 2021

(54) MAGNET MATERIAL, PERMANENT MAGNET, MOTOR, AND POWER GENERATOR

(71) Applicant: Kabushiki Kaisha Toshiba, Minato-ku (JP)

(72) Inventors: Masaki Endo, Tokyo (JP); Yasutaka Nishida, Kanagawa (JP); Shinya Sakurada, Tokyo (JP); Keiko Okamoto, Kanagawa (JP); Fumihiko Aiga, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 292 days.

(21) Appl. No.: 16/354,298

(22) Filed: Mar. 15, 2019

(65) Prior Publication Data
US 2019/0214170 A1    Jul. 11, 2019

Related U.S. Application Data

(60) Division of application No. 14/663,142, filed on Mar. 19, 2015, now Pat. No. 10,361,020, which is a
(Continued)

(30) Foreign Application Priority Data

Nov. 7, 2013    (JP) .................................. 2013-231293

(51) Int. Cl.
*H01F 1/047*    (2006.01)
*H01F 1/08*    (2006.01)
(Continued)

(52) U.S. Cl.
CPC ............ *H01F 1/047* (2013.01); *C22C 33/04* (2013.01); *C22C 33/06* (2013.01); *C22C 38/001* (2013.01);
(Continued)

(58) Field of Classification Search
None
See application file for complete search history.

(56) References Cited

U.S. PATENT DOCUMENTS 5,593,513 A    1/1997    Ramanan et al.
5,966,064 A    10/1999    Yoshizawa et al.
(Continued)

FOREIGN PATENT DOCUMENTS

DE    4002330 A1    8/1990
JP    56-96804    8/1981
(Continued)

OTHER PUBLICATIONS

Shigematsu (J. Phys. Soc. Jpn.; vol. 39:5, 1975). (Year: 1975).*
(Continued)

*Primary Examiner* — Xiaowei Su
(74) *Attorney, Agent, or Firm* — Oblon, McClelland, Maier & Neustadt, L.L.P.

(57) ABSTRACT

A magnet material of an embodiment includes a composition represented by a formula 1: $(Fe_{1-x-y}Co_xT_y)_2(B_{1-a}A_a)_b$, and a metallic structure having a $CuAl_2$ crystal phase as a main phase. T is at least one element selected from V, Cr, and Mn. A is at least one element selected from C, N, Si, S, P, and Al. An atomic ratio x of Co and an atomic ratio y of the element T satisfy $0.01 \leq y \leq 0.5$ and $x+y \leq 0.5$. When the element T includes at least one element selected from V and Cr, a total atomic ratio of V and Cr is 0.03 or more. When the element T includes Mn, an atomic ratio of Mn is 0.3 or less. An atomic ratio a of the element A satisfies $0 \leq a \leq 0.4$. A total atomic ratio b of B and the element A satisfies $0.8 \leq b \leq 1.2$.

13 Claims, 3 Drawing Sheets

Related U.S. Application Data continuation of application No. PCT/JP2014/005615, filed on Nov. 7, 2014.

(51) Int. Cl.

| | |
|---|---|
| *C22C 33/04* | (2006.01) |
| *C22C 33/06* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/10* | (2006.01) |
| *C22C 38/12* | (2006.01) |
| *C22C 38/24* | (2006.01) |
| *C22C 38/30* | (2006.01) |
| *C22C 38/32* | (2006.01) |
| *C22C 38/38* | (2006.01) |
| *H01F 7/02* | (2006.01) |
| *H02K 1/02* | (2006.01) |
| *H02K 1/27* | (2006.01) |
| *C22C 33/02* | (2006.01) |

(52) U.S. Cl.
CPC ............ *C22C 38/002* (2013.01); *C22C 38/02* (2013.01); *C22C 38/04* (2013.01); *C22C 38/06* (2013.01); *C22C 38/10* (2013.01); *C22C 38/12* (2013.01); *C22C 38/24* (2013.01); *C22C 38/30* (2013.01); *C22C 38/32* (2013.01); *C22C 38/38* (2013.01); *H01F 1/08* (2013.01); *H01F 7/02* (2013.01); *H01F 7/021* (2013.01); *H02K 1/02* (2013.01); *H02K 1/27* (2013.01); *B22F 2998/10* (2013.01); *C22C 33/0278* (2013.01); *C22C 2202/02* (2013.01)

(56) References Cited

U.S. PATENT DOCUMENTS

| | | |
|---|---|---|
| 6,261,385 B1 | 7/2001 | Nomura et al. |
| 8,179,068 B2 | 5/2012 | Yuuki et al. |
| 8,552,678 B2 | 10/2013 | Yuuki et al. |
| 8,884,576 B2 | 11/2014 | Yuuki et al. |
| 2014/0184133 A1 | 7/2014 | Yuuki et al. |

FOREIGN PATENT DOCUMENTS

| | | |
|---|---|---|
| JP | 57-29561 | 2/1982 |
| JP | 57-130404 | 8/1982 |
| JP | 61-12854 | 1/1986 |
| JP | 64-84601 | 3/1989 |
| JP | 4-278501 | 10/1992 |
| JP | 7-34207 | 2/1995 |
| JP | 8-13106 | 1/1996 |
| JP | 8-505188 | 6/1996 |
| JP | 2000-353612 | 12/2000 |
| JP | 2006-156543 | 6/2006 |
| JP | 2008-29148 | 2/2008 |
| JP | 2008-43172 | 2/2008 |

OTHER PUBLICATIONS

Witusiewicz (Thermochimica Acta, 1995, vol. 264, p. 41-58). (Year: 1995).*
Machine translation of DE4002330.A1. (Year: 1990).*
International Search Report and Written Opinion dated Feb. 17, 2015, in PCT/JP2014/005615 (w/English translation of categories).
International Preliminary Report on Patentability and Written Opinion dated May 19, 2016 in PCT/JP2014/005615 (submitting English translation only).
Extended European Search Report dated May 26, 2017 in European Application No. 14843230.5.
Iga (Japan J Appl Phys, 1970, vol. 9, p. 415-416).
Na et al. Applied Mechanics and Materials, vol. 34-35, p. 1135-1139 (Year: 2010).

* cited by examiner

MAGNET MATERIAL, PERMANENT MAGNET, MOTOR, AND POWER GENERATOR

CROSS-REFERENCE TO RELATED APPLICATIONS

This application is a division of and claims the benefit of priority under 35 U.S.C. § 120 from U.S. application Ser. No. 14/663,142 filed Mar. 19, 2015, which is a continuation of prior International Application No. PCT/JP2014/005615 filed Nov. 7, 2014, which claims the benefit of priority under 35 U.S.C. § 119 from Japanese Patent Application No. 2013-231293 filed Nov. 7, 2013; the entire contents of each of which are incorporated herein by reference.

TECHNICAL FIELD

Embodiments disclosed herein generally relate to a magnet material, a permanent magnet, a motor, and a power generator.

BACKGROUND ART

A motor is a device which converts an electric energy into a mechanical energy, and is widely used for a general-purpose apparatus such as a washing machine, an electric fan, an AV equipment, an automobile electrical component, and an elevator. In respective types of motors, a permanent magnet type synchronous motor has excellent output characteristics. On the permanent magnet type synchronous motor, a ferrite magnet or a rare-earth magnet is mainly mounted. The rare-earth magnet such as a Sm—Co based magnet or a Nd—Fe—B based magnet is known as a high-performance permanent magnet, and exhibits a magnetic force higher than that of the ferrite magnet, so that a miniaturization and a high output power of the motor can be realized.

The rare-earth magnet contains an expensive rare-earth element as an essential component, so that an application of the magnet to the general-purpose apparatus is not in progress. The ferrite magnet is inexpensive, but is inferior regarding a magnet performance, so that an increase in size of the motor and the like, for example, cannot be avoided. From such a point, there is demanded a permanent magnet which exhibits a magnetic force exceeding that of the existing ferrite magnet without using the rare-earth element. As a magnetic material using no rare-earth element, various iron-based compounds are known. As one of such iron-based compounds, an $Fe_2B$ compound can be cited. A conventional $Fe_2B$ compound is used as a soft magnetic material, and does not achieve properties as a hard magnetic material to be a composing material of the permanent magnet.

DETAILED DESCRIPTION

Hereinafter, a magnet material of an embodiment will be described. The magnet material of the embodiment includes: a composition represented by a composition formula 1: $(Fe_{1-x-y}Co_xT_y)_2(B_{1-a}A_a)_b$, where T is at least one element selected from the group consisting of V, Cr, and Mn, A is at least one element selected from the group consisting of C, N, Si, S, P, and Al, an atomic ratio x of Co and an atomic ratio y of the element T satisfy $0.01 \leq y \leq 0.5$, and $x+y \leq 0.5$, where when the element T includes at least one element selected from V and Cr, a total atomic ratio of V and Cr is 0.03 or more, and when the element T includes Mn, an atomic ratio of Mn is 0.3 or less, an atomic ratio a of the element A satisfies $0 \leq a \leq 0.4$, and a total atomic ratio b of B and the element A satisfies $0.8 \leq b \leq 1.2$; and a metallic structure having a $CuAl_2$ crystal phase as a main phase.

A first concrete example of the magnet material of the embodiment has a composition represented by a composition formula 2: $(Fe_{1-x-p}Co_xV_p)_2(B_{1-a}A_a)_b$, where A is at least one element selected from the group consisting of C, N, Si, S, P, and Al, an atomic ratio x of Co and an atomic ratio p of V satisfy $0.03 \leq p \leq 0.5$, and $x+p \leq 0.5$, an atomic ratio a of the element A satisfies $0 \leq a \leq 0.4$, and a total atomic ratio b of B and the element A satisfies $0.8 \leq b \leq 1.2$.

A second concrete example of the magnet material of the embodiment has a composition represented by a composition formula 3: $(Fe_{1-x-q}Co_xCr_q)_2(B_{1-a}A_a)_b$, where A is at least one element selected from the group consisting of C, N, Si, S, P, and Al, an atomic ratio x of Co and an atomic ratio q of Cr satisfy $0.03 \leq q \leq 0.5$, and $x+q \leq 0.5$, an atomic ratio a of the element A satisfies $0 \leq a \leq 0.4$, and a total atomic ratio b of B and the element A satisfies $0.8 \leq b \leq 1.2$.

A third concrete example of the magnet material of the embodiment has a composition represented by a composition formula 4: $(Fe_{1-x-r}Co_xMn_r)_2(B_{1-a}A_a)_b$, where A is at least one element selected from the group consisting of C, N, Si, S, P, and Al, an atomic ratio x of Co and an atomic ratio r of Mn satisfy $0.01 \leq r \leq 0.3$, and $x+r \leq 0.5$, an atomic ratio a of the element A satisfies $0 \leq a \leq 0.4$, and a total atomic ratio b of B and the element A satisfies $0.8 \leq b \leq 1.2$.

Out of compounds containing iron (Fe) and boron (B), a compound having a composition represented by $Fe_2B$ has been conventionally known as a soft magnetic material. If a part of iron (Fe) is replaced with cobalt (Co) in the $Fe_2B$ compound as above, a uniaxial magnetic anisotropy is exhibited. This is because a crystal structure of (Fe, Co)$_2$B compound is a $CuAl_2$ crystal structure in which components are stacked in layers in a c axis direction. However, the magnetic anisotropy of the (Fe, Co)$_2$B compound is insufficient as that for the permanent magnet, and the permanent magnet formed of the (Fe, Co)$_2$B compound cannot obtain a sufficient coercive force. Since the (Fe, Co)$_2$B compound does not use an expensive rare-earth element, if the magnetic anisotropy of the compound and the coercive force based on the magnetic anisotropy can be increased, it becomes possible to provide a high-performance permanent magnet at a low cost.

The inventors of the present application conducted earnest studies regarding the magnetic anisotropy of the (Fe, Co)$_2$B compound, and as a result of this, they found out that the magnetic anisotropy energy of the (Fe, Co)$_2$B compound is improved by replacing a part of Fe of the Fe$_2$B compound with Co and at least one element T selected from vanadium (V), chromium (Cr), and manganese (Mn). Specifically, the magnetic anisotropy energy exhibited due to the CuAl$_2$ crystal structure in which the components are stacked in layers in the c axis direction described above, sensitively depends on a lattice constant, a lattice strain (c/a), a total electron number and the like. For this reason, it can be expected that the magnetic anisotropy energy is improved by adding an element, to the (Fe, Co)$_2$B compound, that changes the lattice constant, the lattice strain (c/a), the total electron number and the like. It was found out that as an additive element as above, at least one element T selected from V, Cr, and Mn is effective. This makes it possible to provide a high-performance permanent magnet at a low cost.

In the above-described composition formulas 1 to 4, Fe is an element mainly responsible for the magnetization of the magnet material. When a relatively large amount of Fe is contained, it is possible to increase a saturation magnetization of the magnet material. Accordingly, an atomic ratio (1-x-y, 1-x-p, 1-x-q, or 1-x-r) of Fe with respect to a total amount of Fe, Co, and the element T is preferably 0.5 or more. The atomic ratio of Fe is more preferably 0.55 or more, and is still more preferably 0.6 or more. However, the Fe$_2$B compound cannot obtain the uniaxial magnetic anisotropy. In order to realize the hard magnetic material (magnet material) to be a composing material of the permanent magnet, it is preferable to replace a part of Fe of the Fe$_2$B compound with Co and at least one element T selected from V, Cr, and Mn. Therefore, the atomic ratio of Fe is preferably 0.95 or less, more preferably 0.9 or less, and is still more preferably 0.85 or less.

Co is an element responsible for the magnetization of the magnet material, and makes the Fe$_2$B compound exhibit the uniaxial magnetic anisotropy. However, the uniaxial magnetic anisotropy is sometimes exhibited also in a case where a part of Fe of the Fe$_2$B compound is replaced with only the element T, so that an amount of replacement of Fe with Co (atomic ratio x of Co) includes zero. In order to make the Fe$_2$B compound exhibit the magnetic anisotropy with good reproducibility, and to improve the magnetic anisotropy energy, it is preferable that a part of Fe of the Fe$_2$B compound is replaced with Co and the element T. In the composition formulas 1 to 4, the amount of replacement of Fe with Co (x) is preferably 0.05 or more, and is more preferably 0.1 or more.

If a part of Fe of the Fe$_2$B compound is replaced with an excessive amount of Co, there is a possibility that the magnetic anisotropy energy is conversely reduced, and the saturation magnetization is also reduced. A total amount (x+y, x+p, x+q, or x+r) of the amount of replacement of Fe with Co (x) and the amount of replacement of Fe with the element T (atomic ratio y, p, q, or r of the element T) is preferably 0.5 or less. The total amount of replacement of Fe with Co and the element T is preferably 0.05 or more, and is more preferably 0.15 or more. The amount of replacement of Fe with Co (x) is preferably 0.4 or less, more preferably 0.35 or less, and is still more preferably 0.3 or less.

As the element T, at least one element selected from V, Cr, and Mn is used. By replacing a part of Fe of the Fe$_2$B compound or the (Fe, Co)$_2$B compound with an appropriate amount of the element T, the magnetic anisotropy energy of the magnet material mainly formed of an (Fe, T)$_2$B compound or an (Fe, Co, T)$_2$B compound is improved. Therefore, it becomes possible to provide a permanent magnet having a compositional system not using the rare-earth element and exhibiting a magnetic force exceeding that of the existing ferrite magnet, namely, a high-performance permanent magnet at a low cost.

In order to increase the magnetic anisotropy energy of the Fe$_2$B based magnet material, the amount of replacement of Fe with the element T (atomic ratio y of the element T) is preferably 0.01 or more, more preferably 0.03 or more, and is still more preferably 0.05 or more. The amount of replacement of Fe with the element T (y) is preferably 0.5 or less, more preferably 0.45 or less, and is still more preferably 0.4 or less. The amount of replacement of Fe with the element T (y) is preferably set in accordance with the kind of the element T, as will be described below.

Out of the elements T each replacing a part of Fe of the (Fe, T)$_2$B compound or the (Fe, Co, T)$_2$B compound, V and Cr improve the magnetic anisotropy by changing a density of states of Fe. Specifically, if the Fe (Co) site is replaced with at least one element selected from V and Cr (also referred to as element T1, hereinafter), orbits of 3d orbital electrons of Fe adjacent to V or Cr are antiferromagnetically hybridized. A form of the density of states of Fe after the hybridization of orbits becomes close to that of the density of states of Co having a high magnetic anisotropy, so that the magnetic anisotropy energy is considered to be improved. Therefore, it becomes possible to provide a magnet material having a good coercive force.

If the amount of replacement of Fe with the element T1 is too small, it is not possible to sufficiently increase the magnetic anisotropy energy of the magnet material. When the element T in the composition formula 1 includes at least one element T1 selected from V and Cr, the amount of replacement of Fe with the element T1 is preferably 0.03 or more, more preferably 0.05 or more, and is still more preferably 0.1 or more. The same applies to the amount of replacement of Fe with V (atomic ratio p of V) in the composition formula 2, and the amount of replacement of Fe with Cr (atomic ratio q of Cr) in the composition formula 3. In the composition formula 2 and the composition formula 3, the amount of replacement of Fe with V or Cr (p or q) is preferably 0.03 or more, more preferably 0.05 or more, and is still more preferably 0.1 or more.

If the amount of replacement of Fe with the element T1 is too much, the amount of Fe in the (Fe, T)$_2$B compound or the (Fe, Co, T)$_2$B compound is relatively reduced, resulting in that the magnetic anisotropy energy and the saturation magnetization may be reduced. When the element T in the composition formula 1 includes at least one element T1 selected from V and Cr, the amount of replacement of Fe with the element T1, and a total amount of replacement of Fe with the element T1 and Co are preferably 0.5 or less. The amount of replacement of Fe with the element T1 is more preferably 0.45 or less, and is still more preferably 0.4 or less. The same applies to the composition formula 2 and the composition formula 3, and the amount of replacement of Fe with V or Cr (p or q) is preferably 0.5 or less, more preferably 0.45 or less, and is still more preferably 0.4 or less.

Mn is an element which improves the magnetic anisotropy by changing the electron number, the lattice constant, and the lattice strain of the Fe$_2$B compound or the (Fe, Co)$_2$B compound. Specifically, it can be considered that 3d orbital electrons of Mn are sensitive to a crystal field, so that when Mn is introduced into a $CuAl_2$ crystal structure in which an inversion symmetry in the c axis direction is broken, a strong magnetic anisotropy is exhibited in the c axis direction. Therefore, it becomes possible to provide a magnet material having a good coercive force.

If the amount of replacement of Fe with Mn is too small, it is not possible to sufficiently increase the magnetic anisotropy of the magnet material. When the element T in the composition formula 1 includes Mn, the amount of replacement of Fe with Mn is preferably 0.01 or more, more preferably 0.03 or more, and is still more preferably 0.05 or more. The same applies to the amount of replacement of Fe with Mn (r) in the composition formula 4, and the amount of replacement of Fe with Mn (r) is preferably 0.01 or more, more preferably 0.03 or more, and is still more preferably 0.05 or more.

If the amount of replacement of Fe with Mn is too much, the amount of Fe in the $(Fe, T)_2B$ compound or the $(Fe, Co, T)_2B$ compound is relatively reduced, and the stability of the $CuAl_2$ crystal structure is lowered, resulting in that the magnetic anisotropy energy may be conversely reduced. When the element T in the composition formula 1 includes Mn, the amount of replacement of Fe with Mn is preferably 0.3 or less, and is more preferably 0.2 or less. The same applies to the amount of replacement of Fe with Mn (r) in the composition formula 4, and the amount of replacement of Fe with Mn (r) is preferably 0.3 or less, and is more preferably 0.2 or less.

B is an element which makes a perpendicular magnetic anisotropy exhibit by being antiferromagnetically coupled to Fe and Co. The $Fe_2B$ compound or the $(Fe, Co)_2B$ compound has the $CuAl_2$ crystal structure, so that a crystal structure in which Fe (Co) and B are alternately stacked in a [001] direction, is created. In such a stacked structure, Fe (Co) and B are antiferromagnetically coupled, which creates a stabilized state where magnetization directions of adjacent Fe (Co) are aligned. Therefore, a strong magnetic anisotropy is exhibited. In order to maintain the $CuAl_2$ crystal structure, the atomic ratio b of B in the composition formulas 1 to 4 is preferably 0.8 to 1.2. The $CuAl_2$ crystal structure cannot be maintained in both of a case where the atomic ratio b of B is less than 0.8, and a case where the atomic ratio b of B exceeds 1.2.

A part of boron (B) may be replaced with at least one element A selected from carbon (C), nitrogen (N), silicon (Si), sulfur (S), phosphorus (P), and aluminum (Al). The element A improves the magnetic anisotropy by changing the electron number, the lattice constant, the lattice strain and the like of the magnet material. However, if B is replaced with an excessive amount of the element A, there is a possibility of causing a destabilization of the crystal structure. In the compositions formulas 1 to 4, the amount of replacement with the element A is preferably 40 atomic % or less of B. The amount of replacement of B with the element A (atomic ratio a of the element A) is preferably 0.4 or less. Since the element A is an arbitrary element, the amount of replacement of B with the element A (a) includes zero.

A composition analysis for the magnet material is performed by an ICP (Inductively Coupled Plasma) emission spectrochemical analysis method or the like. For the composition analysis, it is preferable to use a powder (alloy powder) prepared by grinding the magnet material by a jet mill, a ball mill or the like. The composition analysis of the alloy powder is conducted 10 times, and an average value of measurement values of the composition analysis except the maximum value and the minimum value, is set as a composition of the magnet material. The composition analysis may also be conducted with respect to a coarse powder before being subjected to the grinding.

The magnet material of the embodiment has the composition represented by the composition formula 1, the composition formula 2, the composition formula 3, or the composition formula 4. Further, the magnet material of the embodiment has the above-described $CuAl_2$ crystal structure, and has a region having such a crystal structure as a main phase. When a cross section or the like of the material is observed with a SEM (Scanning Electron Microscope), the main phase of the magnet material is a phase having a largest area ratio in an observation image (SEM image). The area ratio of the main phase is preferably 50% or more, and is more preferably 70% or more.

The crystal structure of the magnet material of the embodiment can be identified by a powder XRD (X-ray Diffraction). A sample is sufficiently ground by using a mortar, a ball mill or the like. Such a powder is placed on a sample stage, and the XRD measurement is conducted. In order to examine whether a hetero-phase other than the $CuAl_2$ crystal phase is precipitated, it is preferable to perform a measurement within a range of 5 to 90° by $\omega$–2$\theta$ method. The experimental result is subjected to Rietveld analysis, and it is confirmed that the result coincides with a diffraction peak of the $CuAl_2$ crystal structure. Magnetic properties of the magnet material are measured by using a VSM (Vibrating Sample Magnetometer), a BH tracer, a SQUID (Superconducting QUantum Interference Device), or the like.

As described above, by replacing a part of Fe in the $Fe_2B$ compound or the $(Fe, Co)_2B$ compound with the element T (Cr, V, Mn) while maintaining the $CuAl_2$ crystal structure of the compound, it is possible to increase the magnetic anisotropy energy derived from the $CuAl_2$ crystal structure in which Fe (Co) and B are alternately stacked. Therefore, it becomes possible to provide a magnet material having a compositional system not using the rare-earth element and exhibiting a magnetic force exceeding that of the existing ferrite magnet, namely, a high-performance magnet material at a low cost. By using such a magnet material, it becomes possible to provide a high-performance permanent magnet at a low cost. As a permanent magnet of an embodiment, there can be cited, for example, a sintered magnet obtained by sintering a powder (alloy powder) of the magnet material, or a bond magnet obtained by forming a mixture of the powder (alloy powder) of the magnet material and a resin.

The magnet material and the permanent magnet of the embodiments are produced as follows, for example. The magnet material of the embodiment is prepared as an alloy powder containing a predetermined amount of elements. The alloy powder is prepared by grinding an alloy ingot formed through casting of alloy molten metal melted by an arc melting method or a high-frequency melting method, for example. Other examples of the method of preparing the alloy powder are a strip cast method, a mechanical alloying method, a mechanical grinding method, a gas atomization method, a reduction diffusion method, and the like. The alloy powder may also be prepared by a hydrogen plasma arc melting method. With the use of the hydrogen plasma arc melting method, an ultra-fine powder of several nm to several tens nm order can be obtained. In this case, it is preferable to sufficiently take measures against oxidation such that a collection is performed in an inert gas atmosphere in which an oxygen concentration is controlled to several hundreds ppm or less.

When a rapid cooling solidification method such as the strip cast method is employed for preparing the alloy powder, it is preferable that the alloy molten metal is tiltingly injected to a chill roll rotating at a 0.1 to 30 m/second circumferential speed, and an alloy thin strip with a 1 mm thickness or less is continuously formed. There is a tendency that, if the circumferential speed of the chill roll is less than 0.1 m/second, a composition variation is likely to occur in the alloy thin strip, and if the circumferential speed exceeds 30 m/second, crystal grains become fine to a single domain size or less, and a good magnetic property cannot be obtained. The circumferential speed of the chill roll is more preferably in a range of 0.3 to 25 m/second, and is still more preferably in a range of 0.5 to 20 m/second. The alloy powder is prepared by grinding the alloy thin strip in a flake form.

The alloy powder thus obtained, or the alloy ingot or the alloy thin strip before being ground, may be heat-treated for homogenization when necessary. It is preferable to conduct the grinding of the alloy ingot or the alloy thin strip by using a jet mill or a ball mill. The melting of the alloy row material, the casting of the alloy molten metal, and the grinding of the alloy ingot or the alloy thin strip are preferably performed in an inert gas atmosphere or an organic solvent in order to prevent oxidization.

The permanent magnet of the embodiment is produced by using the above-described alloy powder. When an anisotropic magnet is produced, the alloy powder is filled in a mold installed in an electromagnet or the like, and is press-formed while a magnetic field is applied thereto, thereby producing a compression-molded body whose crystal axes are oriented. By sintering the compression-molded body under appropriate conditions, it is possible to obtain a sintered magnet having a high density. The sintering is preferably conducted in the vacuum atmosphere or the inert gas atmosphere of Ar gas or the like. The sintered magnet may also be heat-treated at a temperature equal to or less than a sintering temperature, in order to control the crystal structure and the like. When an isotropic magnet is produced, it is preferable that the alloy powder and a binder resin are mixed, and the obtained mixture is filled in a mold and press-formed, to thereby obtain a bond magnet. The press-forming is performed under the absence of magnetic field or under a radial magnetic field.

The permanent magnet of the embodiment can be used for various motors and power generators. Further, it is possible to use the permanent magnet as a stationary magnet or a variable magnet of a variable magnetic flux motor or a variable magnetic flux power generator. Various motors and power generators are formed by using the permanent magnet of the embodiment. When the permanent magnet of the embodiment is applied to a variable magnetic flux motor, techniques disclosed in JP-A No. 2008-29148 or JP-A No. 2008-43172 can be applied to a configuration and a drive system of the variable magnetic flux motor.

Figure 1:
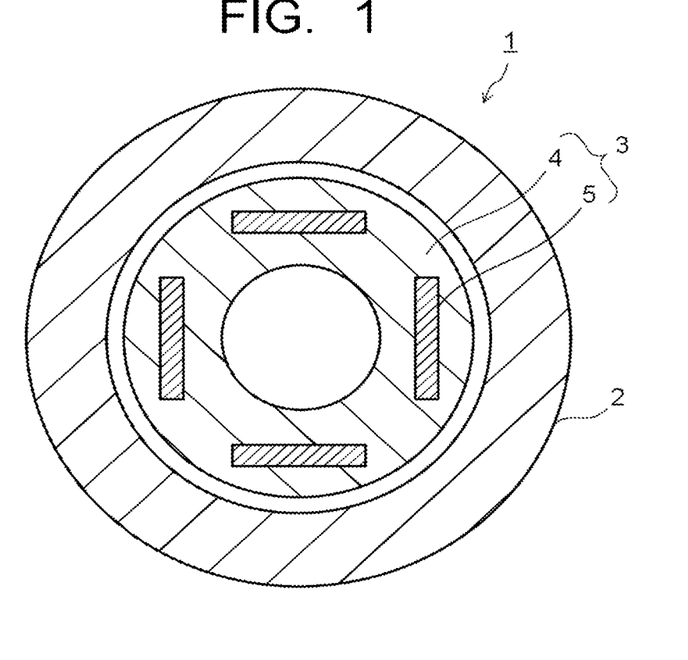
FIG. 1 is a diagram illustrating a permanent magnet motor of an embodiment.

Next, a motor and a power generator of embodiments will be described with reference to the drawings. FIG. 1 illustrates a permanent magnet motor according to the embodiment. In a permanent magnet motor 1 illustrated in FIG. 1, a rotor 3 is disposed in a stator 2. In an iron core 4 of the rotor 3, permanent magnets 5 of the embodiment are disposed. Based on properties and the like of the permanent magnets of the embodiment, high efficiency, miniaturization, cost reduction and the like of the permanent magnet motor 1 can be achieved.

Figure 2:
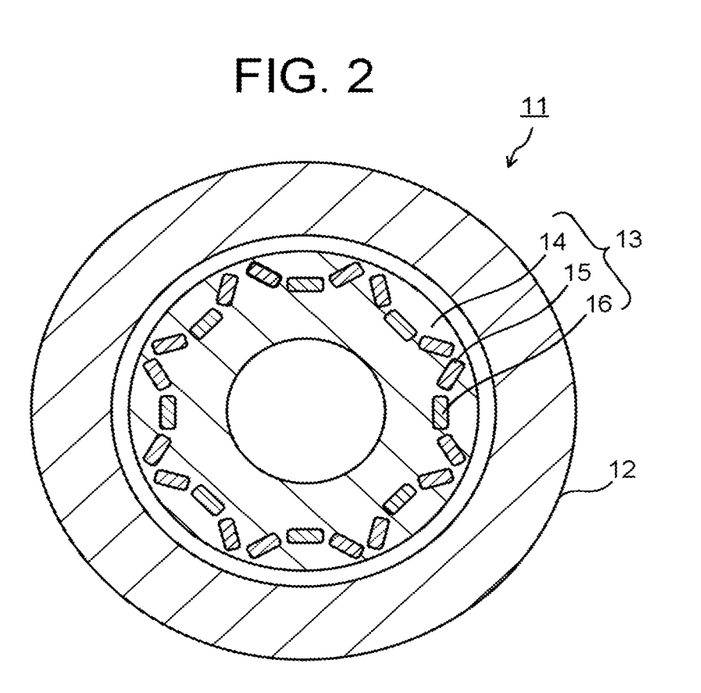
FIG. 2 is a diagram illustrating a variable magnetic flux motor of an embodiment.

FIG. 2 illustrates a variable magnetic flux motor of the embodiment. In a variable magnetic flux motor 11 illustrated in FIG. 2, a rotor 13 is disposed in a stator 12. In an iron core 14 of the rotor 13, the permanent magnet of the embodiment is disposed as at least either of stationary magnets 15 and variable magnets 16. A magnetic flux density (magnetic flux amount) of the variable magnets 16 is variable. A magnetization direction of the variable magnets 16 is orthogonal to a Q-axis direction, and thus is not affected by a Q-axis current, and can be magnetized by a D-axis current. A magnetization winding (not illustrated) is provided on the rotor 13. It is structured such that by passing a current through the magnetization winding, a magnetic field thereof operates directly on the variable magnets 16. The variable magnetic flux motor 11 is capable of outputting a large torque from a small device size, and thus is preferred for a motor of a hybrid vehicle, electric vehicle, or the like required to have high output power and small size of the motor.

Figure 3:
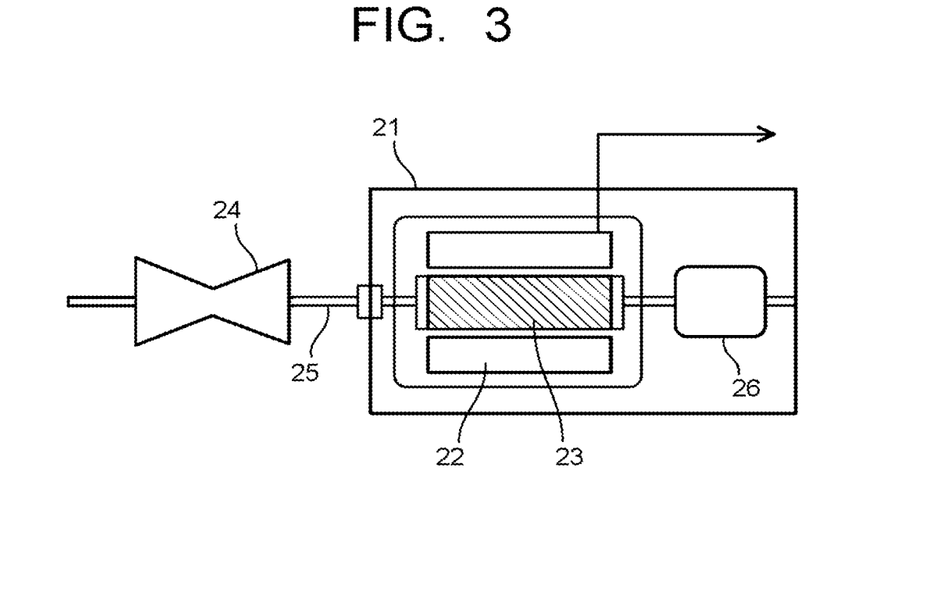
FIG. 3 is a diagram illustrating a power generator of an embodiment.

FIG. 3 illustrates a power generator according to the embodiment. A power generator 21 illustrated in FIG. 3 includes a stator 22 using the permanent magnet of the embodiment. A rotor 23 disposed inside the stator 22 is coupled to a turbine 24 provided on one end of the power generator 21 via a shaft 25. The turbine 24 is rotated by fluid supplied from the outside. It is also possible to rotate the shaft 25 by, not the turbine 24 rotated by fluid, but a transmission of dynamic rotations of regenerative energy or the like of an automobile. The shaft 25 is in contact with a commutator (not illustrated) disposed on the opposite side of the turbine 24 with respect to the rotor 23, and electromotive force generated by rotations of the rotor 23 is increased in voltage to a system voltage and transmitted as output of the power generator 21 via isolated phase buses and a main transformer (not illustrated). The power generator 21 may be either of an ordinary power generator and a variable magnetic flux power generator. A static electricity from the turbine 24 or charges by an axial current accompanying power generation occur on the rotor 23. The power generator 21 has a brush 26 for discharging the charges of the rotor 23.

EXAMPLES

Next, examples and evaluation results thereof will be described.

Comparative Example 1

After respective raw materials of Fe, Co, and B were weighed to achieve desired compositions, the resultants were arc-melted in an Ar gas atmosphere, thereby producing master alloys. The compositions of the master alloys were adjusted to be compositions presented in Table 1 (($Fe_{1-x}Co_x)_2B$). These master alloys were melted, and then rapid-cooled by using a rapid cool solidification apparatus, thereby producing alloy thin strips. Each of the obtained alloy thin strips had a fine structure of about several hundreds nm. The alloy thin strips thus obtained were subjected to a property evaluation to be described below.

Example 1, Comparative Example 2

After respective raw materials of Fe, Co, V, and B were weighed to achieve desired compositions, the resultants were arc-melted in an Ar gas atmosphere, thereby producing master alloys. The compositions of the master alloys were adjusted to be compositions presented in Table 2 (($Fe_{1-x-y}Co_xV_y)_2B$). As a comparative example 2, a master alloy containing excessive amounts of Co and V, and a master alloy having a small content of V, were also produced. These master alloys were melted, and then rapid-cooled by using the rapid cool solidification apparatus, thereby producing alloy thin strips. Each of the obtained alloy thin strips had a fine structure of about several hundreds nm. The alloy thin strips thus obtained were subjected to the property evaluation to be described below.

Example 2, Comparative Example 3

After respective raw materials of Fe, Co, Cr, and B were weighed to achieve desired compositions, the resultants were arc-melted in an Ar gas atmosphere, thereby producing master alloys. The compositions of the master alloys were adjusted to be compositions presented in Table 3 $((Fe_{1-x-y}Co_xCr_y)_2B)$. As a comparative example 3, a master alloy containing excessive amounts of Co and Cr, and a master alloy having a small content of Cr, were also produced. These master alloys were melted, and then rapid-cooled by using the rapid cool solidification apparatus, thereby producing alloy thin strips. Each of the obtained alloy thin strips had a fine structure of about several hundreds nm. The alloy thin strips thus obtained were subjected to the property evaluation to be described below.

Example 3, Comparative Example 4

After respective raw materials of Fe, Co, Mn, and B were weighed to achieve desired compositions, the resultants were arc-melted in an Ar gas atmosphere, thereby producing master alloys. The compositions of the master alloys were adjusted to be compositions presented in Table 4 $((Fe_{1-x-y}Co_xMn_y)_2B)$. As a comparative example 4, a master alloy containing excessive amounts of Co and Mn, and a master alloy having a small content of Mn, were also produced. These master alloys were melted, and then rapid-cooled by using the rapid cool solidification apparatus, thereby producing alloy thin strips. Each of the obtained alloy thin strips had a fine structure of about several hundreds nm. The alloy thin strips thus obtained were subjected to the property evaluation to be described below.

Example 4

After respective raw materials of Fe, Co, V, Cr, Mn, and B were weighed to achieve desired compositions, the resultants were arc-melted in an Ar gas atmosphere, thereby producing master alloys. The compositions of the master alloys were adjusted to be compositions presented in Table 5 $((Fe_{1-x-y1-y2-y3}Co_xV_{y1}Cr_{y2}Mn_{y3})_2B)$. These master alloys were melted, and then rapid-cooled by using the rapid cool solidification apparatus, thereby producing alloy thin strips. The alloy thin strips thus obtained were subjected to the property evaluation to be described below.

Example 5

After respective raw materials of Fe, Co, the element T, B, and the element A were weighed to achieve desired compositions, the resultants were arc-melted in an Ar gas atmosphere, thereby producing master alloys. The compositions of the master alloys were adjusted to be compositions presented in Table 6 $((Fe_{1-x-y}Co_xT_y)_2(B_{1-a}A_a)_b)$. These master alloys were melted, and then rapid-cooled by using the rapid cool solidification apparatus, thereby producing alloy thin strips. The alloy thin strips thus obtained were subjected to the property evaluation to be described below.

(Property Evaluation)

Figure 4:
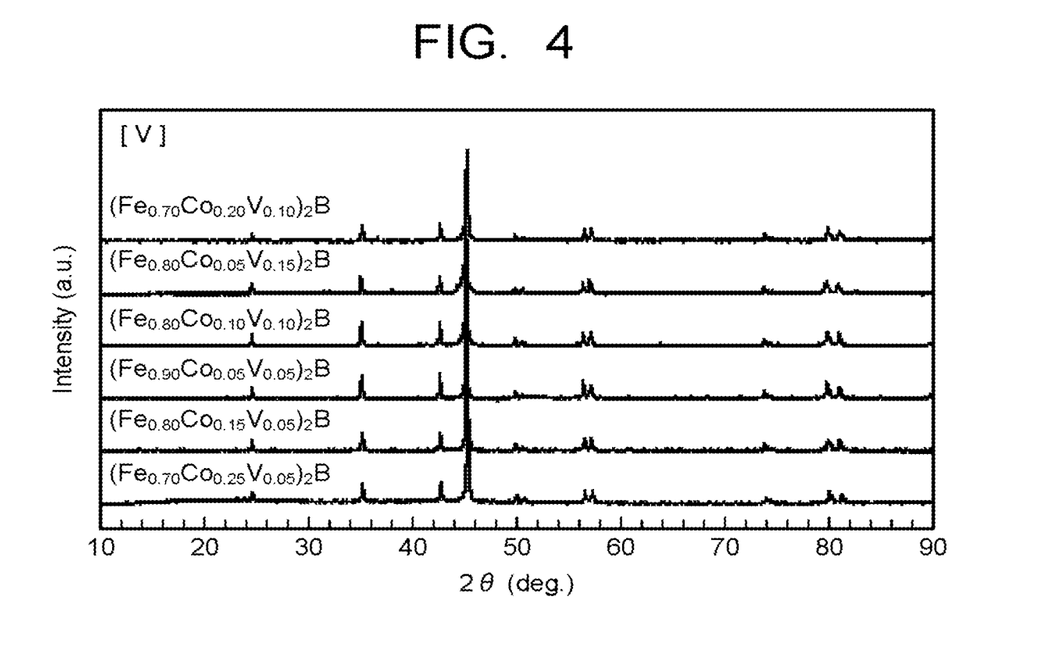
FIG. 4 is a diagram illustrating an X-ray diffraction result of a magnet material of an example 1.
Figure 5:
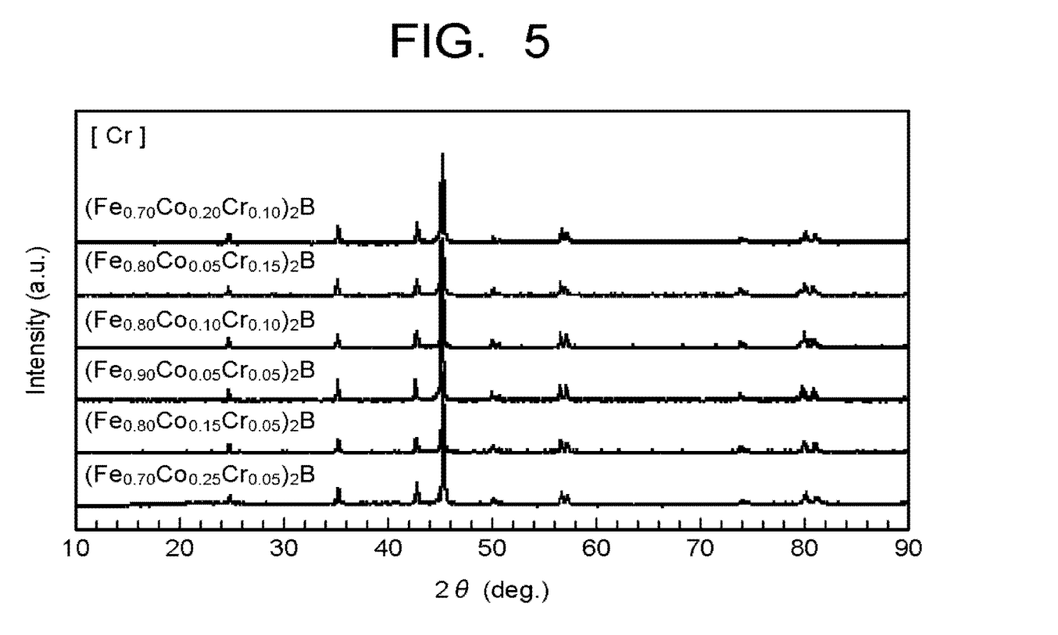
FIG. 5 is a diagram illustrating an X-ray diffraction result of a magnet material of an example 2.
Figure 6:
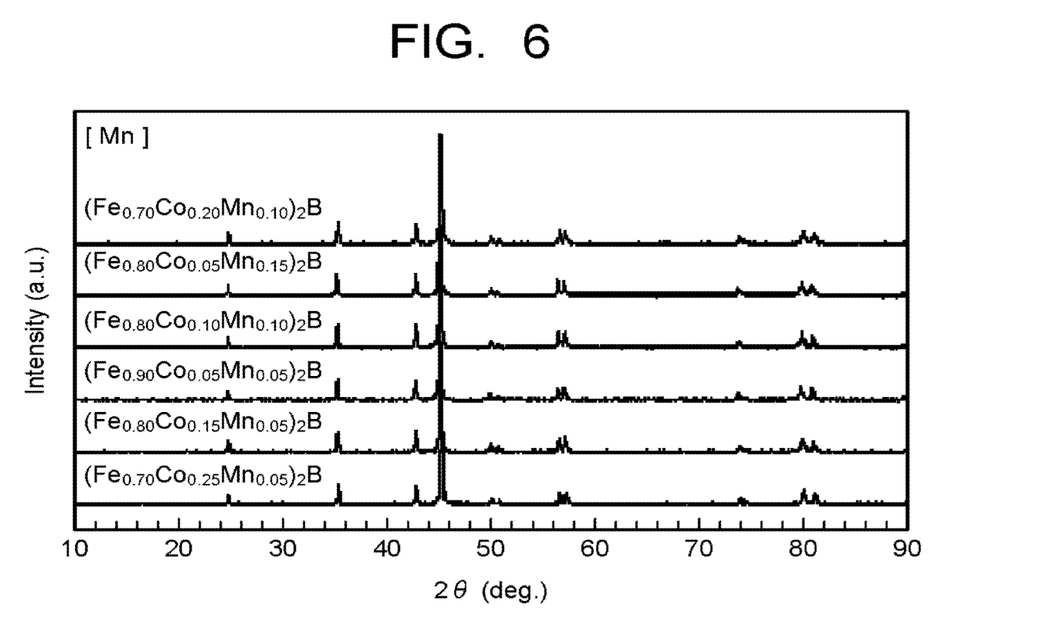
FIG. 6 is a diagram illustrating an X-ray diffraction result of a magnet material of an example 3.

The magnetic properties of the alloy thin strips of the examples 1 to 5 and the comparative examples 1 to 4 were evaluated by using the BH tracer, to thereby measure the coercive force and the saturation magnetization. Results thereof are presented in Table 1 to Table 6. It is possible to improve the coercive force Hc of the magnet material by adding an appropriate amount of the element T to the Fe—Co—B based magnet material or the Fe—B based magnet material. The crystal structure of each of the magnet materials of the examples 1 to 3 was evaluated by using an X-ray diffraction method. Results thereof are presented in FIG. 4 to FIG. 6. It was confirmed that each of the magnet materials (alloy thin strips) of the examples has the $CuAl_2$ crystal structure. From these results, it was confirmed that, by adding the appropriate amount of the element T to the magnet material having the $CuAl_2$ crystal structure, the coercive force Hc of the magnet material having the $CuAl_2$ crystal structure is improved.

TABLE 1

| | $(Fe_{1-x}Co_x)_2B$ | | Coercive Force | Saturation |
|---|---|---|---|---|
| | Co Atomic Ratio x | Element T | Hc [kA/m] | Magnetization [T] |
| Comparative Example 1 | 0.1 | — | 5.6 | 1.43 |
| | 0.2 | — | 7.9 | 1.38 |
| | 0.3 | — | 9.5 | 1.32 |
| | 0.4 | — | 6.4 | 1.26 |
| | 0.5 | — | 2.5 | 1.20 |

TABLE 2

| | $(Fe_{1-x-y}Co_xT_y)_2B$ | | | Coercive | Saturation |
|---|---|---|---|---|---|
| | Co Atomic Ratio x | Element | Atomic Ratio y | Force Hc [kA/m] | Magnetization [T] |
| Example 1 | 0.1 | V | 0.4 | 57.3 | 0.50 |
| | 0.1 | V | 0.3 | 50.9 | 0.72 |
| | 0.1 | V | 0.2 | 39.0 | 0.95 |
| | 0.1 | V | 0.1 | 26.3 | 1.20 |
| | 0.1 | V | 0.05 | 17.5 | 1.28 |
| | 0.2 | V | 0.3 | 54.9 | 0.68 |
| | 0.2 | V | 0.2 | 44.6 | 0.89 |
| | 0.2 | V | 0.1 | 29.4 | 1.11 |
| | 0.2 | V | 0.05 | 20.7 | 1.20 |
| | 0.3 | V | 0.2 | 53.3 | 0.85 |
| | 0.3 | V | 0.1 | 34.2 | 1.07 |
| | 0.3 | V | 0.05 | 21.5 | 1.20 |
| | 0.4 | V | 0.1 | 54.9 | 1.02 |
| | 0.4 | V | 0.05 | 19.9 | 1.14 |
| | — | V | 0.5 | 45.2 | 0.35 |
| | — | V | 0.4 | 50.4 | 0.58 |
| Comparative Example 2 | 0.1 | V | 0.5 | 43.5 | 0.27 |
| | 0.4 | V | 0.01 | 5.6 | 1.23 |

TABLE 3

| | $(Fe_{1-x-y}Co_xT_y)_2B$ | | | Coercive | Saturation |
|---|---|---|---|---|---|
| | Co Atomic Ratio x | Element | Atomic Ratio y | Force Hc [kA/m] | Magnetization [T] |
| Example 2 | 0.1 | Cr | 0.4 | 57.3 | 0.65 |
| | 0.1 | Cr | 0.3 | 56.5 | 0.83 |

TABLE 3-continued $(Fe_{1-x-y}Co_xT_y)_2B$

| | Co Atomic Ratio x | Element T Element | Atomic Ratio y | Coercive Force Hc [kA/m] | Saturation Magnetization [T] |
|---|---|---|---|---|---|
| | 0.1 | Cr | 0.2 | 47.0 | 1.00 |
| | 0.1 | Cr | 0.1 | 35.8 | 1.21 |
| | 0.1 | Cr | 0.05 | 25.5 | 1.23 |
| | 0.2 | Cr | 0.3 | 62.9 | 0.83 |
| | 0.2 | Cr | 0.2 | 54.1 | 0.99 |
| | 0.2 | Cr | 0.1 | 39.0 | 1.17 |
| | 0.2 | Cr | 0.05 | 28.6 | 1.21 |
| | 0.3 | Cr | 0.2 | 68.4 | 0.95 |
| | 0.3 | Cr | 0.1 | 58.1 | 1.11 |
| | 0.3 | Cr | 0.05 | 45.4 | 1.18 |
| | 0.4 | Cr | 0.1 | 64.5 | 1.16 |
| | 0.4 | Cr | 0.05 | 34.2 | 1.20 |
| | — | Cr | 0.5 | 36.5 | 0.63 |
| | — | Cr | 0.4 | 38.6 | 0.66 |
| Comparative Example 3 | 0.1 | Cr | 0.5 | 42.3 | 0.55 |
| | 0.4 | Cr | 0.01 | 7.8 | 1.23 |

TABLE 4

$(Fe_{1-x-y}Co_xT_y)_2B$

| | Co Atomic Ratio x | Element T Element | Atomic Ratio y | Coercive Force Hc [kA/m] | Saturation Magnetization [T] |
|---|---|---|---|---|---|
| Example 3 | 0.1 | Mn | 0.3 | 27.8 | 1.35 |
| | 0.1 | Mn | 0.2 | 23.1 | 1.37 |
| | 0.1 | Mn | 0.1 | 13.5 | 1.35 |
| | 0.1 | Mn | 0.05 | 10.5 | 1.34 |
| | 0.2 | Mn | 0.3 | 34.2 | 1.26 |
| | 0.2 | Mn | 0.2 | 33.4 | 1.32 |
| | 0.2 | Mn | 0.1 | 15.9 | 1.35 |
| | 0.2 | Mn | 0.05 | 11.2 | 1.34 |
| | 0.3 | Mn | 0.2 | 33.4 | 1.24 |
| | 0.3 | Mn | 0.1 | 19.1 | 1.30 |
| | 0.3 | Mn | 0.05 | 11.5 | 1.29 |
| | 0.4 | Mn | 0.1 | 24.7 | 1.27 |
| | 0.4 | Mn | 0.05 | 12.1 | 1.26 |
| | — | Mn | 0.5 | 15.3 | 1.35 |
| | — | Mn | 0.4 | 16.5 | 1.38 |
| Comparative Example 4 | 0.1 | Mn | 0.4 | 4.6 | 1.29 |
| | 0.4 | Mn | 0.005 | 5.2 | 1.27 |

TABLE 5

$(Fe_{1-x-y1-y2-y3}Co_xV_{y1}Cr_{y2}Mn_{y3})_2B$

| | Co x | Atomic Ratio y1 of V | Atomic Ratio y2 of Cr | Atomic Ratio y3 of Mn | Coercive Force Hc [kA/m] | Saturation Magnetization [T] |
|---|---|---|---|---|---|---|
| Example 4 | 0.1 | 0.2 | 0.2 | — | 55.6 | 0.57 |
| | 0.1 | 0.1 | 0.1 | — | 38.7 | 0.97 |
| | 0.2 | 0.1 | 0.1 | — | 43.1 | 0.94 |
| | 0.3 | 0.1 | 0.1 | — | 51.9 | 0.90 |
| | 0.2 | 0.2 | — | 0.1 | 37.6 | 0.85 |
| | 0.2 | — | 0.2 | 0.1 | 32.5 | 0.96 |
| | 0.1 | 0.1 | 0.1 | 0.1 | 35.2 | 0.90 |

TABLE 6

$(Fe_{1-x-y}Co_xT_y)_2(B_{1-a}A_a)_b$

| | Co Atomic Ratio x | Element T Element | Atomic Ratio y | Element A Element | Atomic Ratio a | Atomic Ratio b | Coercive Force Hc [kA/m] | Saturation Magnetization [T] |
|---|---|---|---|---|---|---|---|---|
| Example 5 | 0.1 | V | 0.3 | C | 0.4 | 0.8 | 46.7 | 0.77 |
| | 0.1 | V | 0.3 | C | 0.4 | 1.0 | 52.1 | 0.75 |
| | 0.1 | V | 0.3 | C | 0.4 | 1.2 | 44.6 | 0.73 |
| | 0.1 | V | 0.3 | N | 0.4 | 1.0 | 51.5 | 0.74 |
| | 0.1 | V | 0.3 | Si | 0.4 | 1.0 | 52.3 | 0.71 |
| | 0.1 | V | 0.3 | S | 0.3 | 1.0 | 54.5 | 0.70 |
| | 0.1 | V | 0.3 | P | 0.3 | 1.0 | 55.1 | 0.71 |
| | 0.1 | V | 0.3 | Al | 0.3 | 1.0 | 53.4 | 0.69 |
| | 0.1 | Cr | 0.3 | N | 0.3 | 1.0 | 60.8 | 0.84 |
| | 0.1 | Cr | 0.2 | N | 0.4 | 1.0 | 48.6 | 1.01 |
| | 0.1 | Mn | 0.3 | N | 0.3 | 1.0 | 53.6 | 1.36 |
| | 0.1 | Mn | 0.2 | N | 0.4 | 1.0 | 51.9 | 1.32 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the methods described herein may be made without departing from the spirit of the inventions. The accompanying claims and their equivalents are intended to cover such forms or modifications as would fall within the scope and spirit of the inventions.

What is claimed is:

1. A magnet material, comprising:
a composition represented by a composition formula 1:

$$(Fe_{1-x-y}Co_xMn_y)_2(B_{1-a}A_a)_b$$

where A is at least one element selected from the group consisting of C, N, Si, S, P, and Al, an atomic ratio x of Co and an atomic ratio y of Mn satisfy $0.1 \leq x \leq 0.4$, $0.01 \leq y \leq 0.3$, and $x+y \leq 0.5$, an atomic ratio a of the element A satisfies $0 \leq a0.4 \leq 0.4$, and a total atomic ratio b of B and the element A satisfies $0.8 \leq b \leq 1.2$; and a metallic structure having a $CuAl_2$ crystal phase as a main phase.

2. The magnet material of claim 1, wherein the atomic ratio y of Mn satisfies $0.05 \leq y \leq 0.3$.

3. The magnet material of claim 1, wherein a coercive force of the magnet material is 10.5 kA/m or more.

4. The magnet material of claim 1, wherein a coercive force of the magnet material is 10.5 kA/m or more and 34.2 kA/m or less.

5. The magnet material of claim 1, wherein a saturation magnetization of the magnet material is 1.24 T or more.

6. The magnet material of claim 1, wherein a saturation magnetization of the magnet material is 1.24 T or more and 1.38 T or less.

7. A permanent magnet, comprising the magnet material of claim 1.

8. A motor, comprising the permanent magnet of claim 7.

9. A power generator, comprising the permanent magnet of claim 7.

10. A magnet material, comprising:

a composition represented by a composition formula 2:

$$(Fe_{1-x-y-z}Co_xMn_yT_z)_2(B_{1-a}A_a)_b$$

where T is at least one element selected from the group consisting of V and Cr, A is at least one element selected from the group consisting of C, N, Si, S, P, and Al, an atomic ratio x of Co, an atomic ratio y of Mn and an atomic ratio z of the element T satisfy $0.1 \leq x \leq 0.4$, $0.01 \leq y \leq 0.3$, $0 \leq z \leq 0.4$, and $x+y+z \leq 0.5$, an atomic ratio a of the element A satisfies $0 \leq a \leq 0.4$, and a total atomic ratio b of B and the element A satisfies $0.8 \leq b \leq 1.2$; and a metallic structure having a $CuAl_2$ crystal phase as a main phase.

11. A permanent magnet, comprising the magnet material of claim 10.

12. A motor, comprising the permanent magnet of claim 11.

13. A power generator, comprising the permanent magnet of claim 11.

* * * * *